Figure 1:
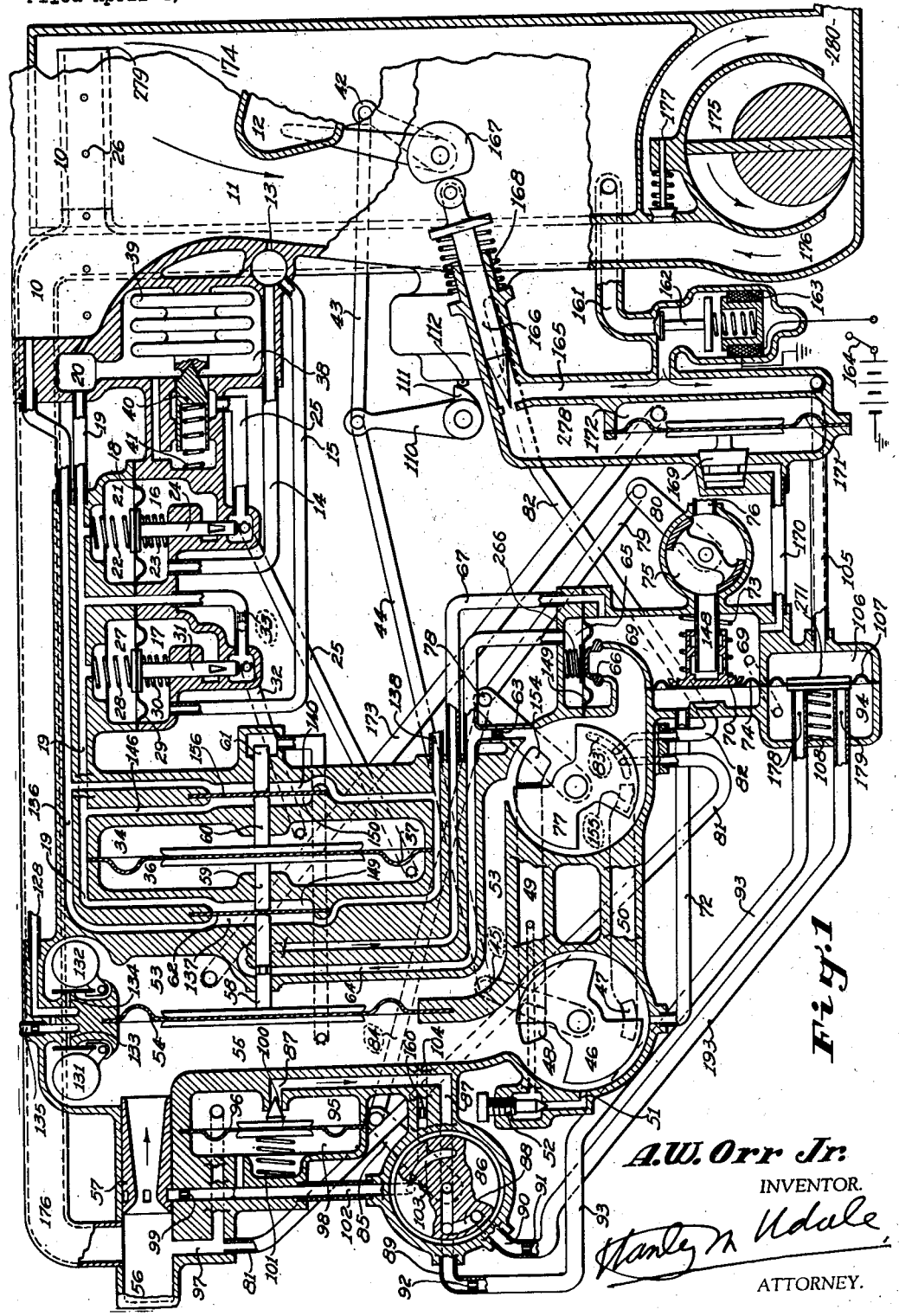

A. W. Orr Jr.
INVENTOR.
ATTORNEY.

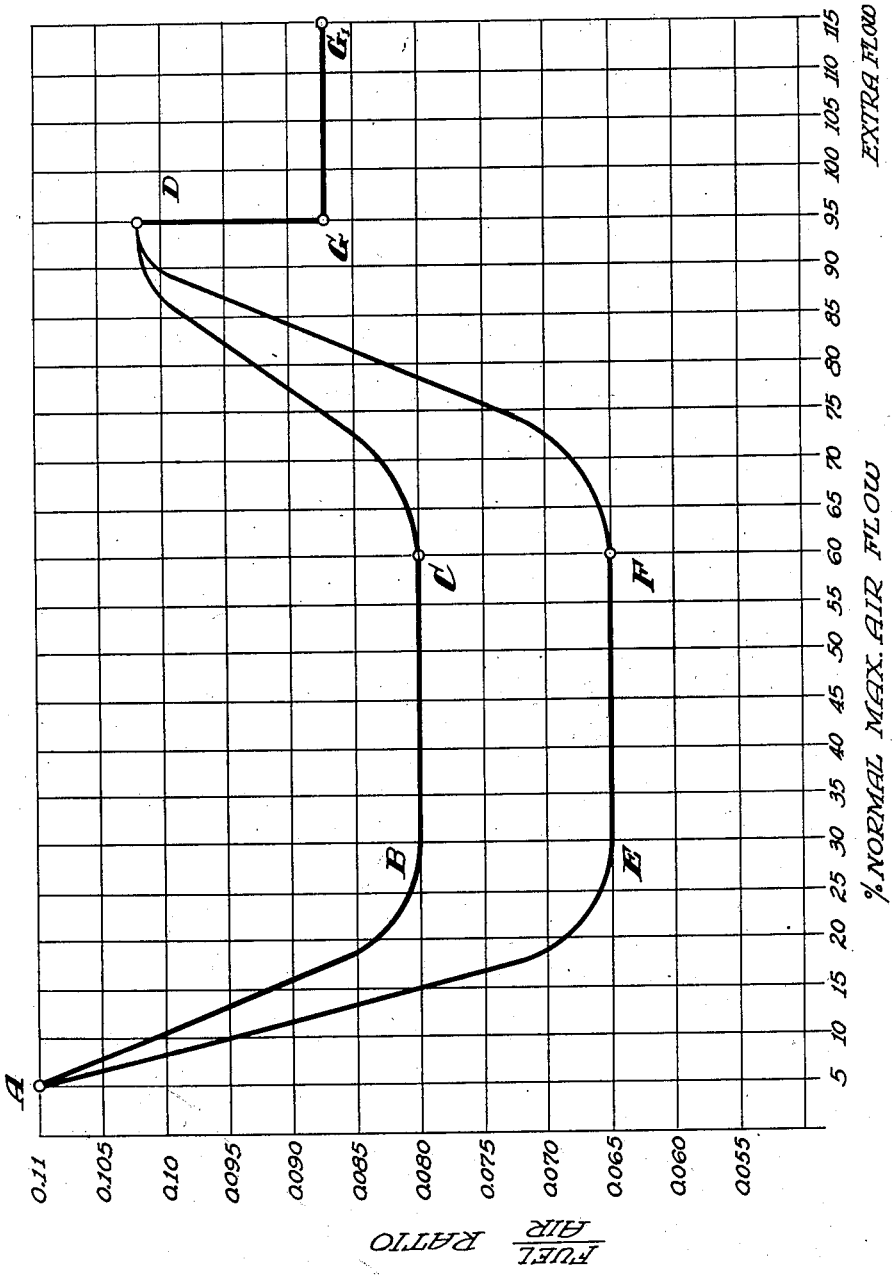

Patented May 3, 1949

2,468,941

UNITED STATES PATENT OFFICE 2,468,941

ENRICHENING DEVICE

A. William Orr, Jr., Detroit, Mich., assignor to George M. Holley and Earl Holley Application April 4, 1945, Serial No. 586,606

3 Claims. (Cl. 261—18)

The object of this invention is to provide an enrichening device which adds a certain amount to the fuel when the mixture is set for cruising lean, and when set for cruising rich, the enrichening device is only permitted to add a less amount. For example, if the cruising lean mixture is .065, then a 57% enrichment gives .102 mixture. If cruising rich is .08, then a 27% enrichment gives .102 mixture.

An additional object is to provide for the acceleration requirements and to incorporate means whereby when the manual control lever is moved from the "cruising lean" to the idle cut-out position the acceleration means are eliminated.

Another additional object is to substitute water or other anti-detonating fuels for a portion of the enrichening fuel. The quantity of this water is regulated by the flow of fuel and air so that the consumption of water is held to a minimum.

Figure 1 shows diagrammatically my invention incorporated in an airplane carburetor.

Figure 2 shows the fuel/air ratio at various air flows and the effect of the addition of water at high air flows on the fuel/air ratio. This application contains subject matter common to Serial No. 581,644 filed March 8, 1945 now patent 2,465,535 of March 29, 1949, by George M. Holley, Jr. and this application is directed chiefly to the disclosure contained in the lower part and on the left portion of Fig. 1.

In Fig. 1, 10 is the air entrance, 11 is the throat of a venturi, 12 is the throttle, which, when moved to the left counter-clockwise, converts the venturi 11 into a variable venturi, 13 is an opening into the throat of the variable venturi 11—12, thus formed, 14 is a passage connecting the orifice 13 with the chamber 16, 15 is a passage parallel to and below the passage 14 and connecting the orifice 13 with the chamber 17, 18 is a diaphragm above the chamber 16, 19 is a passage connecting the annular chamber 20 with a chamber 21 immediately above the diaphragm 18, springs 22 and 23 support the diaphragm 18, which carries a metering needle 24, which controls the connection between the chamber 16 and a passage 25. The annular chamber 20 is in communication with the air entrance 10 through a large number of openings 26, so that the pressure of the air entrance exists in the chamber 21.

This pressure of the air entering the carburetor also exists in a similar chamber 27, in which there is a similar spring 28 and a diaphragm 29 corresponding to the diaphragm 18, and a spring 30 corresponding to the spring 23, and a metering needle 31 corresponding to the needle 24. This needle 31 forms a restricted communication between the chamber 17 below the diaphragm 29 and a passage 32, which communicates through a restriction 33 with the air inlet pressure line 19. The passage 32 communicates with a chamber 34, the passage 25 communicates with a chamber 36, so that a diaphragm 37, which separates the chamber 34 from the chamber 36, is supported on one side by the pressure in the pipe 32 and on the other side by the suction in the pipe 25. The pressure in the chamber 34 is higher than the pressure in the passage 25; that is to say, the valve 24 is normally opened to such a degree as to admit a good deal of the suction in pipe 14 to the chamber 36, whereas the valve 31 is normally closed and only opens at comparatively high suctions, so that substantially atmospheric pressure exists in chamber 34.

A chamber 38, in free communication with the annular chamber 20, contains a group of altitude bellows 39, which, at altitude, expand and cause the valve 40 to move to the left, compressing the spring 41. The valve 40, which is a balanced valve, then admits a restricted amount of atmospheric air to the passage 25, which as stated above is a suction passage, so that when the bellows 39 expand due to a lowering of the atmospheric pressure in the entrance 10, the pressure in the pipe 25 rises relative to the pressure in the pipe 32, which is not affected by the bellows 39. At altitude, the influence of the air flow on the diaphragm 37 is thus diminished, and the mixture ratio is thus maintained within the desired limits.

The throttle 12 is rotated by the throttle lever 42, which is connected to the link 43, which in its turn is connected to the link 44 to the lever 45. This lever 45 and its control disc 46 are shown turned clockwise into a position approaching the wide-open throttle position and thus partially open fuel metering orifices 47 and 48, which admit metered fuel to passages 49 and 50. The valve 77 in the automatic lean position, as shown, obstructs the flow through the restriction 47 and passage 50 by closing the port 155, but permits that metered by the opening 48 through the passage 49 to flow into the chamber 53 through the open port 154. This metered fuel, together with the small quantity of fuel which flows through a bypass 51 past a low speed adjusting needle 52 into passage 49, communicates through the port 154 with the chamber 53 to the right of a diaphragm 54, which is to the right of the fuel entrance chamber 55, which communicates with a fuel entrance 56 through a fuel venturi 57. Hence, the diaphragm 54 is subject to the pressure drop at the orifice 48 or at orifices 47—48 when valve 77 is moved counter-clockwise 45° to open port 155 to the automatic rich position.

The pilot valve 58 engages through the diaphragm 62 with the pin 59, which engages through the diaphragm 37 with the pin 60, which pin 60 engages through the small diaphragm 156 with the pin 61. In order that the flow shall be regulated, pilot valve 58 controls the flow of metered fuel from an orifice 63 through a passage 64, past valve 58 to a passage 67, which communicates with a chamber 69 below the valve 66. The pressure in the passage 64 and in a chamber 65 connected thereto is equal to the pressure of the metered fuel in the passage 49 less the drop at the restriction 63. This drop is controlled by the valve 58. The pressure thus regulated in chamber 65 acts on a diaphragm 149, and a spring 266 tends to seat the valve 66. When the flow is excessive compared with the air flow, then the fuel pressure acting on the diaphragm 54 pushes the valve 58 over to the right, overcoming the air pressure difference due to air flow acting on diaphragm 37. The valves 66 and 58 then partly close as diaphragms 54 and 37 move to the right. The fuel, thus metered, flows to the outlet chamber 69, in which is located a valve 70, mounted on a diaphragm 74, to the left-hand side of which is a chamber, which communicates through the passage 72 with the unmetered fuel in chamber 55.

A spring 73 tends to push the diaphragm 74 to the left and thus opens the valve 70, which allows fuel to flow through the passage 148 past the cut-off valve 75 to the outlet 76.

The mixture control valve 77 is controlled by a lever 78 and a link 79, which also controls cut-off valve 75 through the lever 80. When the valve 77 moves clockwise, it moves into the idle cut-off position; when it moves counterclockwise, it moves to the automatic rich position (A. R.). As shown, it is in the automatic lean position. When valve 77 is rotated anti-clockwise 45°, fuel is admitted from the variable restriction 47, so that the fuel flow through both 48 and 47 controls the pressure in chamber 53. This is the automatic rich position (A. R.).

Valve 77 and link 79 are connected through the link 84 to the lever 85, which controls the rotation of the valve 86. In the position shown in which the mixture control valve 77 closes port 155, the outlet 47 is closed and fuel is admitted only through the passage 48. In that position, the valve 86 forms a path from the passage 87 to the L shaped passage 88, which communicates with the passage 89 and also with the passage 90. These passages 89 and 90 communicate through the restriction 91 and through the restriction 92 to the passages 93 and 193 and so to the chamber 94, which communicates with the chamber 69, so that any fuel flowing through the passages 93 and 193 is added to the fuel flowing past the restriction 48.

Valve 66 is seated by a spring 166 and also by the pressure in the chamber 65 connected to the passage 64. This pressure acts on the upper side of the diaphragm 149. The under portion of the valve 66 is subjected to the pressure in the passage 49 acting through the port 154. The pressure in 65 is regulated by the valve 58. Hence, the valve 58 controls the movement of the valve 66. Hence, when the fuel flow is excessive compared with the air flow, then the fuel flow acting on the diaphragm 54 is great compared with the air pressure due to air flow acting on the diaphragm 37. The valves 58 and 66 then move in the direction of closing as diaphragms 54 and 37 are moved to the right. This arrangement will give a constant fuel/air ratio. The fuel/air ratio must progressively become richer as the fuel flow and air flow increase. Otherwise, the engines would become overheated. Obviously, at maximum fuel flow and at maximum air flow, fuel economy is of minor importance, the major importance being given to power and the greatest importance being given to preventing the engine burning up, and, of course, a rich mixture is much cooler than a mixture which gives perfect combustion.

The fuel flowing through 87 flows out of the chamber 95 to the right of the diaphragm 96, which chamber 95 communicates with the fuel entrance 56 through the passage 97. The fuel flow through the restriction 92 and passage 93 escapes through the restriction 178. 179 is an opening in the pipe 193 corresponding to the opening 178 in the pipe 93. The chamber 98, to the left of diaphragm 96, communicates with the throat of the venturi 57 through the restricted orifice 99. Valve 100 is carried by the diaphragm 96 and is seated by a compression spring 101 in the chamber 98, so that the flow through the venturi 57 must be great enough to compress the spring 101; otherwise, the valve 100 will not open, so that the valve 100 only opens at high air flows and when the fuel flow is correspondingly high.

A passage 102 connects with the restricted orifice 99, and in the position shown is inoperative. When the lever 85 is moved counter-clockwise into the automatic rich position (A. R.), an opening 103 in valve 86 allows fuel to flow towards orifice 99 and along the passage 102 from the passage 104. The jet numbered 160, located in the passage 104, is an important restriction in the fuel metering system. Restriction 99 is inserted only to make the jet 160 of small enough size. The flow through the restriction 160, through the passage 103, through the passage 102, increases the pressure in the chamber 98, so that the valve 100 will not open so much in the cruising rich position for the same fuel flow through the venturi 57. Jet 99 can be omitted if the suction holes in the venturi throat 57 are of the proper size and are held to close limits in production.

The passage 104 communicates with the unmetered fuel in the chamber 55 so that when the lever 85 is moved counter-clockwise to the automatic rich position (A. R.), a certain amount of fuel flows from the chamber 55 through the passage 104, through the restricted orifice 103, to the passage 102, and so the pressure in the chamber 98 rises. Hence, the valve 100 closes slightly, and the combined effect of rotating the lever 85 counter-clockwise is to open valve 77 so as to admit fuel from port 47 and by rotating valve 86 to cut off the fuel flowing through 89 and restrict the fuel to the capacity of the restriction 91. In addition, the operating pressure difference, which causes the valve 100 to move to the left to open, is no longer as powerful because of the back bleed from 104 through 160, 103, up 102, through 99 to the throat of venturi 57.

When anti-detonating liquid is required to obtain military output, the practice is to cut down the fuel added by the power enrichment venturi 57, valve 100 and passages 87, 89, 90 and 93. The pressure of this anti-detonation liquid, water, for example, is applied through a passage 105 to a chamber 106 containing a diaphragm 107. This compresses a spring 108 contained in chamber 94. The diaphragm 107 is adapted to close the ends of the passages 93 and 193 so that when anti-detonating fluid is added, the fuel flow through passages 93 and 193 is restricted to that which can escape through the restricted openings 178 and 179.

Anti-detonation fluid

Anti-detonating fluid, water, for example, contained in the bottom of the tank 174, is admitted through the pipe 161 past the valve 162, which is controlled by the solenoid 163 and the manually-controlled switch 164. The outlet from the valve 162 branches, branch 105 going to the chamber 106 containing the diaphragm 107, thus compressing the spring 108 and closing the outlet from the passages 93 and 193 as already described. Branch 165 flows around the valve 166, which is held against the flat of the cam 167 by the compression spring 168. The cam 167 is moved by the throttle lever 42. The anti-detonating fluid (water), contained in the bottom of the tank 174, then flows past valve 169 through the passage 170 to the chamber 69. A diaphragm 171 controls the valve 169. A chamber 172 to the right of the diaphragm 171 is connected by the passage 173 to the chamber 53. The chamber 278, located on the other side of diaphragm 171, is subjected to the pressure downstream of the valve 166. The gasoline in the upper part of the tank 174 is at the pressure of the fuel entering the carburetor through the passage 56 because of the opening 279 provided to connect the pipe 176 to the tank 174. An engine-driven pump 175 supplies fuel through the passage 176 from fuel entrance 280 to the upper part of the tank 174 and also to the fuel entrance of the carburetor through the pipe 176 and passage 56. A spring-loaded pressure relief valve 177 regulates the pressure in tank 174. When the diaphragm 107 closes the outlets from the pipes 93 and 193, a limited quantity of fuel continues to flow through the small orifices 178 and 179.

Acceleration

When the throttle 12 is opened rapidly, the lever 110, connected to the throttle 12 and lever 45 by links 43 and 44, is rotated clockwise and supplies pressure through the cam 111 to the finger 112, which is moved to the right which movement provides accelerating fuel for the engine by hydraulic means not shown.

Passages 81 and 82 are connected through the passage 83 in the valve 77. When the valve 77 is moved 45° into the idle cut-off position, the passage 83 moves clockwise and leaves the two passages 81 and 82 separated from each other. The object of this is that when the attempt is made to stop the engine by placing the valve in the idle cut-off position, the attempt might fail unless the accelerating means were rendered inoperative. The instructions are that when the throttle 12, which is in the position to give approximately 1050 revolutions per minute, is opened, thus flooding the engine with air and rendering the mixture non-explosive, the accelerating device operated by the finger 112 and cam 111 will automatically function unless the pipe 81 is separated from the pipe 82, and it is most undesirable when stopping an engine for the accelerating device to discharge fuel. Moreover, as the engine slows down, the pressure in the pipe 81 automatically falls, which also is apt to cause the untimely discharge of fuel from the accelerating device. When the accelerating device is used and the wobble pump is used, the increase of pressure in the pipe 81 in the case of the accelerating device will cause the accelerating device to function. For all these reasons, it is desirable to separate 81 from 82 when in the idle cut-off position.

Vapor separation

The unmetered fuel in the chamber 55 is vented through the passage 135; metered fuel in 53 is vented through 128. The vapor is thus removed from the upper part of the chambers 53—55. Floats 131—132 have integral with them valves which control the orifices 133—134. Passage 136 communicates with the air entrance 10 and with the chamber 137 to the left of diaphragm 62 and also with the drain passage 138. Passage 136 also communicates with the chamber 140 to the right of diaphragm 156, and chamber 140 also communicates with the drain passage 138.

The passage 19 communicates with the passage 146, which communicates with the chamber 150 on the left-hand side of the diaphragm 156. The passage 19 also communicates with the right-hand side of diaphragm 62, that is, with chamber 149, so that the diaphragms 62 and 156 have the same pressure on each side.

Operation

When operating in the position shown, which is the automatic lean position (cruising lean), the restriction 160 has no function, because in that event the slot 103 has no connection with passage 102. Under these circumstances, all the fuel that can flow through the restrictions 92 and 91 is admitted to the engine once the fuel flow through fuel venturi 57 is big enough to unseat valve 100.

When the lever 85 is moved into the automatic rich (A. R.) position, approximately 45° anti-clockwise from the position shown, then the flow is restricted to that which can flow down pipe 90 and through restriction 91 along the passage 193. It is restricted also because the opening of the valve 100 is delayed as the flow back through 160 to 103 and pipe 102 through 99 to venturi 57 delays the opening of the valve 100 until the critical flow is higher than it was when the lever 78 was in the automatic lean (A. L.) position shown.

Hence, the rotation anti-clockwise of lever 85 not only reduces the extra flow, but delays the start of the added fuel flow until the main fuel flow is higher than it was with the control in the automatic lean (A. L.) position.

When the mixture control lever is moved into the idle cut-off position, 45° clockwise from the automatic lean (A. L.) position in which it is shown, the two passages 81 and 82 become separated and the accelerating means become inoperative.

Again, if the anti-detonating fluid is admitted to the chamber 106 (this fluid being admitted to the engine through passage 161—165—170), it is undesirable to have much of the extra fuel from passages 89—90—93 admitted through the valve 100 as well as the anti-detonating fluid. Hence, the diaphragm 107 moves to the left to restrict the flow of this extra fuel. The object of the extra fuel admitted past the valve 100 is to prevent detonation; hence, there would be duplication if both the extra fuel and the anti-detonating fluid were admitted at the same moment.

In the figure, the admission of the anti-detonating fluid is controlled by the pilot's switch 164 and is determined by the position of the valve 16$^a$, which is such that the pressure in the chamber 278 balances the pressure in the chamber 172. The pressure in chamber 172 equals that in chamber 53, which is the downstream pressure of the fuel passing the metering orifice 48 or orifices 47 and 48 if both are effective. The pressure in chamber 278 equals the pressure in the tank 174 less the drop past the valve 166. The pressure in the chamber 53 likewise equals the pressure in tank 174 less the drop through the metering orifice 48 or orifices 47 and 48, as the case may be. Hence, as the drop past the valve 48 or past the valves 47 and 48 increases, more water is admitted. This drop in pressure is the operating force of the diaphragm 54. By this means the pressure in the chamber 278 is equal to the pressure in chamber 172. The pressure in 172 is equal to the pressure in chamber 53. Hence, the flow of water is dependent on the difference in fuel pressure between chambers 53 and 55 ignoring the gravity head which is negligible. The passage 165 on the upstream side in the needle 166 is the pressure in the fuel and water tank 174. Therefore, the pressure drop at the needle 166 corresponds to the pressure drop at the fuel opening 48. Hence, the fuel flow past 48 and the flow past 166 of water will be in proportion to each other and the flow past the needle 166 will vary with the air flow through the variable opening between throttle 12 and the wall of the air passage.

This arrangement will therefore give the same air-water ratio whether the control is set for cruising lean or set for cruising rich. With cruising lean, only the orifice 48 is open, but the drop in pressure is determined by the air flow and the fuel pressure drop is controlled by the drop in the variable air venturi, which is wide open or nearly so when the water is admitted.

*Fuel/air ratios*

In Figure 2, the curve A E F D represents the F/A ratios when lever 85 is in position shown the vertical ordinates represent the fuel/air ratios; horizontal lines represent percentage of air flow, that is, the percentage of maximum air flow. The point A represents the fuel/air ratio of point 1—1 at 5% of the normal maximum air flow, the horizontal line B—C represents the cruising rich mixture .080 when the lever 85 is rotated approximately 45° anti-clockwise, the horizontal line E—F represents the cruising lean mixture .065, point D, mixture ratio .102, represents the rich mixture, wide open throttle, at 95% of the maximum air flow. The vertical line D—G represents the reduction in mixture ratio due to the closing of the valve 271 attached to diaphragm 107 on the admission of water and is due to the obstruction of the flow through the pipes 93 and 193 when water is added. The difference between G and F, which is .007, is due to the opening 179. The difference between G and F, which is .022, is due to the openings 178 and 179.

From G to G$^1$, from 95–115% air flow, the mixture ratio remains at .087, point C indicates the moment when the valve 100 unseats and responds to the fuel flow .080 at the time when the air flow is 60% of the normal maximum air flow. The point F responds to a fuel flow 20% less, the restriction 160 is so designed with reference to restriction 99 that the fuel flow at F, which unseats the valve 100, is considerably less than the fuel flow when the mixture ratio is .080, which unseats the valve 100 at the point C. Obviously, there is 23% more fuel flow at the point C than there is at the point F. Hence, the fuel flow corresponding to the point C must be made less effective than the fuel corresponding to the point F. C and F are both at 60% of normal maximum air flow.

What I claim is:

1. In a carburetor having an air entrance, a restriction therein, a fuel passage, a restriction therein, automatic means responsive to the drops in pressure in both fuel and air restrictions for maintaining a predetermined mixture ratio of fuel to air, manual means for increasing the fuel flow at the same drop in pressure and thus changing this ratio from cruising lean to a larger ratio for cruising rich, automatic enrichening means responsive to a predetermined high rate of fuel flow and adapted to increase the fuel to air mixture ratio, including a second fuel restriction located in series with the first restriction, a chamber, a moving wall therein dividing said chamber into two portions namely a high pressure portion connected to the fuel pressure on the upstream side of said second fuel restriction, a low pressure portion connected to be subjected to the drop in pressure due to fuel flow through said second restriction, an enrichening valve connected to said moving wall, a second fuel passage controlled by said valve and connected in parallel with the first fuel passage so as to admit the enrichening fuel beyond the first restriction, a bypass from the high pressure to the low pressure side of said moving wall, a second manually controlled valve positively connected to said first manual control valve so that the two valves open together, said second manually controlled valve being located in said bypass so as to reduce, when opened, the pressure difference acting on said moving wall so as to require a higher fuel flow through said second restriction before said enrichening valve will open when the first manually controlled means is moved to its rich position so that the ultimate maximum total fuel flow is the same for all positions of the manual means.

2. In a carburetor having a source of fuel under pressure, a fuel passage, two variable fuel restrictions in said passage in parallel, a diaphragm, a chamber at the pressure of the entering fuel and located on one side of said diaphragm, the pressure downstream from said restrictions being applied to the other side, an air entrance, a variable air restriction therein, a second diaphragm, two chambers associated therewith, one subjected to the pressure of the entering air, the other to the pressure in the throat of the variable air restriction, said diaphragm being adapted to oppose the movement of first diaphragm, automatic means connected to both diaphragms to control the fuel flow, mechanical means for controlling said variable air and both fuel restrictions simultaneously, a manual mixture control comprising a fuel valve located in series with one of said variable fuel restrictions and adapted to close the outlet from that particular fuel restriction, a fuel enrichening device responsive to a high rate of fuel flow and adapted to increase the proportion of fuel to air whenever the quantity of fuel flow exceeds a predetermined value, said diaphragms and the said automatic means connected to both diaphragms being adapted to increase the quantity of enrichening fuel whenever one of the variable fuel restrictions is blocked so that the cruising lean mixture is enriched by the addition of much more fuel than is added to the cruising rich mixture whereby the resulting mixture ratio at maximum air flow is the same whether the control is set for cruising lean or for cruising rich.

3. An engine fuel supply system comprising an air intake, an air restriction therein, a source of fuel under pressure, a fuel supply passage connected thereto, a restriction therein, automatic means responsive to the depression in said air restriction acting in opposition to the means responsive to the drop in pressure at said fuel restriction for varying the pressure downstream from said fuel restriction for maintaining a desired fuel/air ratio, a fuel enrichening device responsive to an increase in fuel flow above a predetermined value, a source of anti-detonating fluid under the same pressure as the source of fuel, a passage therefor, a manually controlled valve therein, means for introducing the anti-detonating fluid into the air entering the engine comprising a restriction in said anti-detonating fluid passage, a moving wall, a valve in the anti-detonating fuel passage connected to said moving wall, a chamber located on one side of said moving wall connected to the anti-detonating fuel passage downstream from said restriction, a second chamber located on the other side of said moving wall connected to the fuel under pressure existing downstream of said main fuel restriction whereby the drop in pressure at the restriction in said anti-detonating fuel passage is maintained equal to the drop in pressure at the restriction in the main fuel passage.

A. WILLIAM ORR, JR.

REFERENCES CITED

The following references are of record in the file of this patent:

UNITED STATES PATENTS

| Number | Name | Date |
|---|---|---|
| Re. 22,254 | Chandler | Jan. 26, 1943 |
| 2,361,227 | Mock | Oct. 24, 1944 |
| 2,361,228 | Mock | Oct. 24, 1944 |
| 2,372,356 | Chandler | Mar. 27, 1945 |

FOREIGN PATENTS

| Number | Country | Date |
|---|---|---|
| 828,458 | France | May 18, 1938 |